United States Patent [19]
Cheung et al.

[11] Patent Number: 5,636,862
[45] Date of Patent: Jun. 10, 1997

[54] AIR BAG ASSEMBLY WITH TETHER

[75] Inventors: Bonnie Y. Cheung, Auburn Hills; Timothy W. Hill, Troy; Kenneth H. Desaele, Romeo; Jeffrey A. Welch, Saint Clair Shores, all of Mich.

[73] Assignee: General Motors Corporation, Detroit, Mich.

[21] Appl. No.: 526,150

[22] Filed: Sep. 7, 1995

[51] Int. Cl.⁶ .................................................. B60R 21/22
[52] U.S. Cl. .................................. 280/730.2; 280/743.2
[58] Field of Search ........................... 280/743.1, 743.2, 280/730.1, 730.2, 728.1

[56] References Cited

U.S. PATENT DOCUMENTS 5,112,079  5/1992  Haland et al.
5,251,931  10/1993  Semchena et al. ............... 280/730.1
5,333,899  8/1994  Witte ............................... 280/730.2
5,364,123  11/1994  Abramczyk et al. ............ 280/743.1
5,398,958  3/1995  Taggart ........................... 280/743.1

*Primary Examiner*—Paul N. Dickson
*Attorney, Agent, or Firm*—Kathryn A. Marra

[57] ABSTRACT

An air bag assembly in a vehicle has an inflator for generating gas and an air bag deployable upon generation of gas by the inflator. The air bag assembly also includes a tether being substantially external to the air bag. The tether has a first end connected to the air bag and a second end connected to the vehicle. Preferably, the second end of the tether is spaced laterally apart from the first end of the tether such that upon air bag deployment, the tether provides lateral support to the air bag.

19 Claims, 3 Drawing Sheets

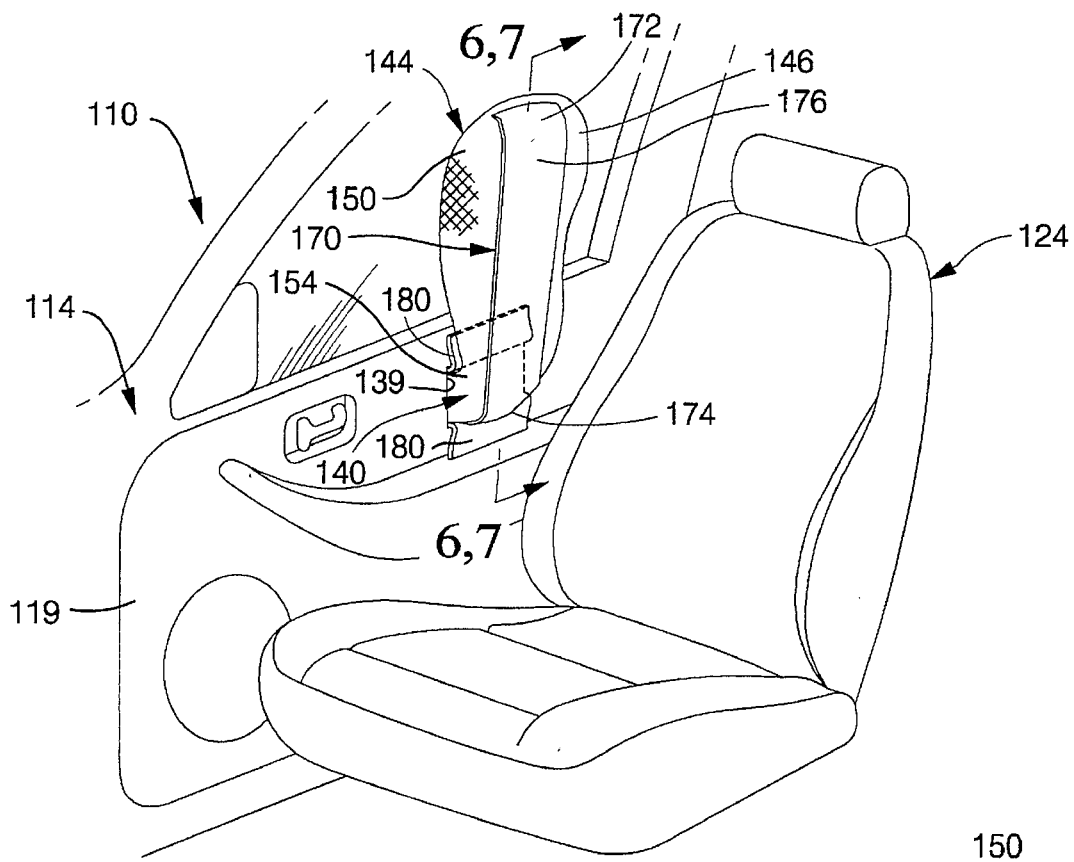
FIG. 5
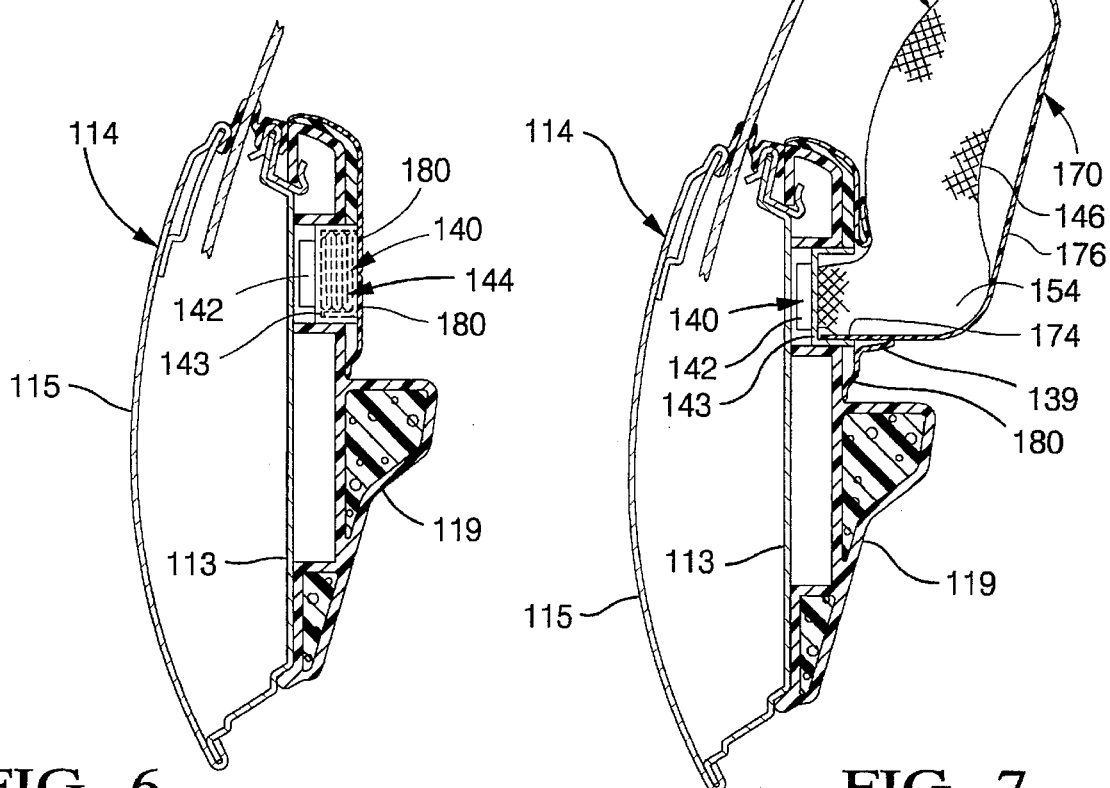
FIG. 6
FIG. 7

AIR BAG ASSEMBLY WITH TETHER

This invention relates to a vehicle air bag assembly, and more particularly to an air bag assembly having a tethered air bag for protecting a vehicle occupant.

BACKGROUND OF THE INVENTION

It is well known in motor vehicles to provide an air bag assembly for protecting a vehicle occupant. It is also known to provide an air bag assembly including an air bag and an inflator for generating gas to inflate the air bag upon sensing predetermined vehicle conditions. It is also known to provide an air bag assembly for side impact protection of the vehicle occupant.

The prior art has disclosed side impact air bag assemblies which have either one air bag or a plurality of air bags which deploy to protect the head and torso portions of the vehicle occupant. These air bags have an inboard contact face for contacting the vehicle occupant and have an opposite outboard face which must be supported by nearby vehicle structure such as the door, window, or pillar to prevent the occupant from pushing the air bag away. However, many times the support structure is not in a convenient location for air bag placement or the support structure, such as a window, is not always in place as a reaction surface during air bag deployment.

SUMMARY OF THE INVENTION

This invention solves the shortcomings of the prior art by providing an air bag assembly having an air bag which reduces or eliminates the need for supportive vehicle structure as a reaction surface to keep the occupant from pushing the air bag away. Instead, the air bag includes an external tether which is attached to the vehicle structure to laterally support the air bag and to limit lateral movement of the air bag during deployment.

These advantages are accomplished in a preferred form of the present invention by providing an air bag assembly in a vehicle having an inflator for generating gas and an air bag deployable upon generation of gas by the inflator. The air bag assembly also includes a tether being substantially external to the air bag. The tether has a first end connected to the air bag and a second end connected to the vehicle. Preferably, the second end of the tether is spaced laterally apart from the first end of the tether such that upon air bag deployment, the tether provides lateral support to the air bag.

Advantageously, the air bag assembly of the present invention may be incorporated into many locations in the vehicle. For example, the second end of the tether may be attached to the vehicle at the vehicle seat, vehicle door or any other location on the vehicle which preferably is laterally spaced apart from the first end of the tether. As another example, the air bag may include a housing and the second end of the tether may be attached to the vehicle at the housing such that the entire tether is stored with the air bag inside the housing prior to deployment. Also advantageously, the air bag assembly may be located at numerous locations in the vehicle such as the vehicle door or vehicle seat.

In a preferred form of the invention, the air bag has an inboard face and the first end of the tether is attached to the inboard face. Preferably, the first end of the tether is wider than the second end of the tether or has a widened portion thereon to provide a wider tether area for interaction with a vehicle occupant. In another form of the invention, the air bag assembly is disposed on the vehicle door and the first end of the tether is attached to the inboard face of the air bag and the second end of the tether is spaced laterally outboard from the first end of the tether and extends beneath the air bag for attachment to the vehicle.

In accordance with another preferred aspect of the invention, the tether includes a middle portion extending between the first end and the second end. The air bag assembly includes a connecting member slidably connecting the middle portion of the tether to the vehicle to limit movement of the middle portion of the tether in a predetermined direction during air bag deployment. The connecting member may be a bracket mounted to the vehicle and including a passageway through which the middle portion of the tether slidably extends.

BRIEF DESCRIPTION OF THE DRAWINGS

An embodiment of the present invention is described, by way of example only, with reference to the accompanying drawings in which:

FIG. 5 is a perspective view of a vehicle interior partially-broken-away and showing yet another alternate embodiment of the air bag assembly in a deployed condition and located in a vehicle door;

FIG. 6 is a sectional view taken along line 6—6 of FIG. 5, but showing the air bag assembly in the undeployed condition; and FIG. 7 is a sectional view taken along line 7—7 of FIG. 5 and showing the air bag assembly in the deployed condition.

DESCRIPTION OF THE PREFERRED EMBODIMENT

Figure 1:
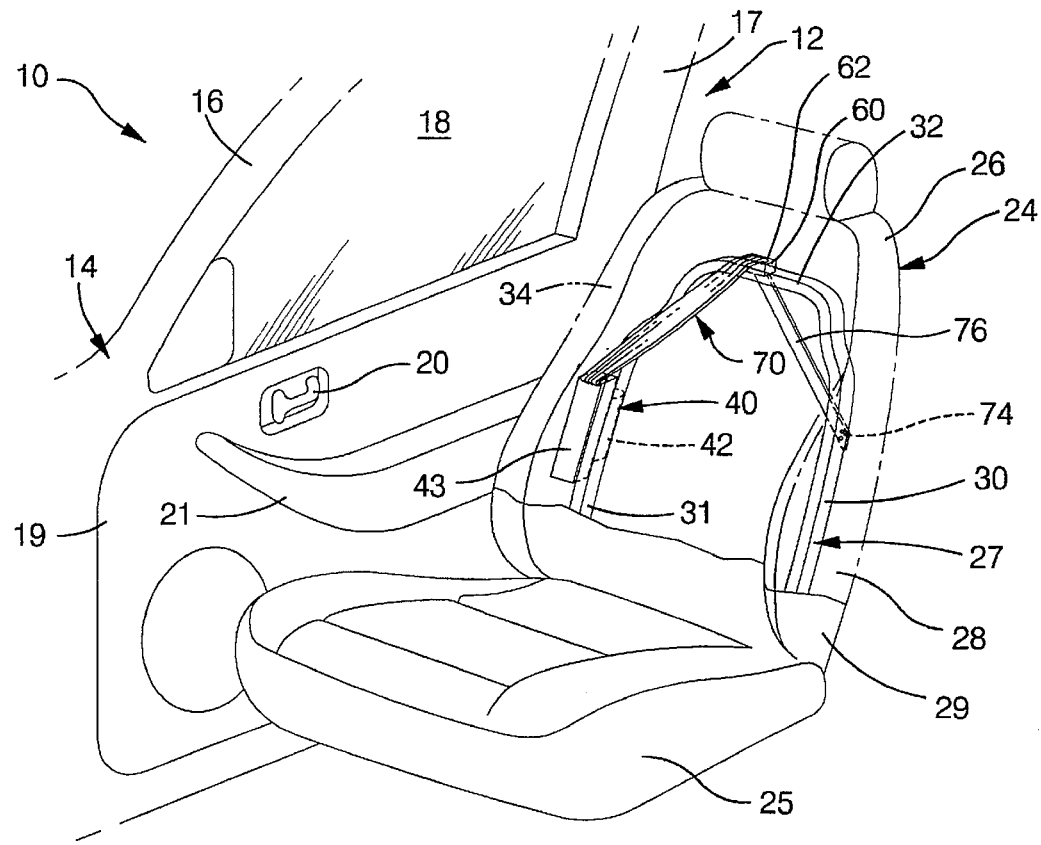
FIG. 1 is a perspective view of a vehicle interior partially-broken-away and including an air bag assembly in an undeployed condition located in a vehicle seat.

Referring to FIG. 1, it is seen that a vehicle 10 includes a vehicle interior 12 having a door 14 including a front side door pillar 16 and a rear side door pillar 17 and a movable window 18 mounted thereon. The door 14 also includes an inner door trim panel 19 mounting a door handle 20 and an armrest 21.

The vehicle interior 12 further includes a seat 24 having a lower seat bottom 25 and an upper seat back 26. The upper seat back 26 includes a rigid seat frame 27, preferably being metal, and including an inboard rail 30, an outboard rail 31 and an upper rail 32. The seat frame 27 is encompassed by a cushion portion 28 preferably formed of foam material covered by fabric seat material 29 defining the contour of the outer surface of the seat back 26. The fabric material 29 of the seat back 26 includes a vertically extending frangible seat seam 34 proximate the inner door trim panel 19. A vehicle occupant (not shown) may be seated in the vehicle seat 24 in a well-known manner and includes an upper head portion and a lower torso portion.

Figure 2:
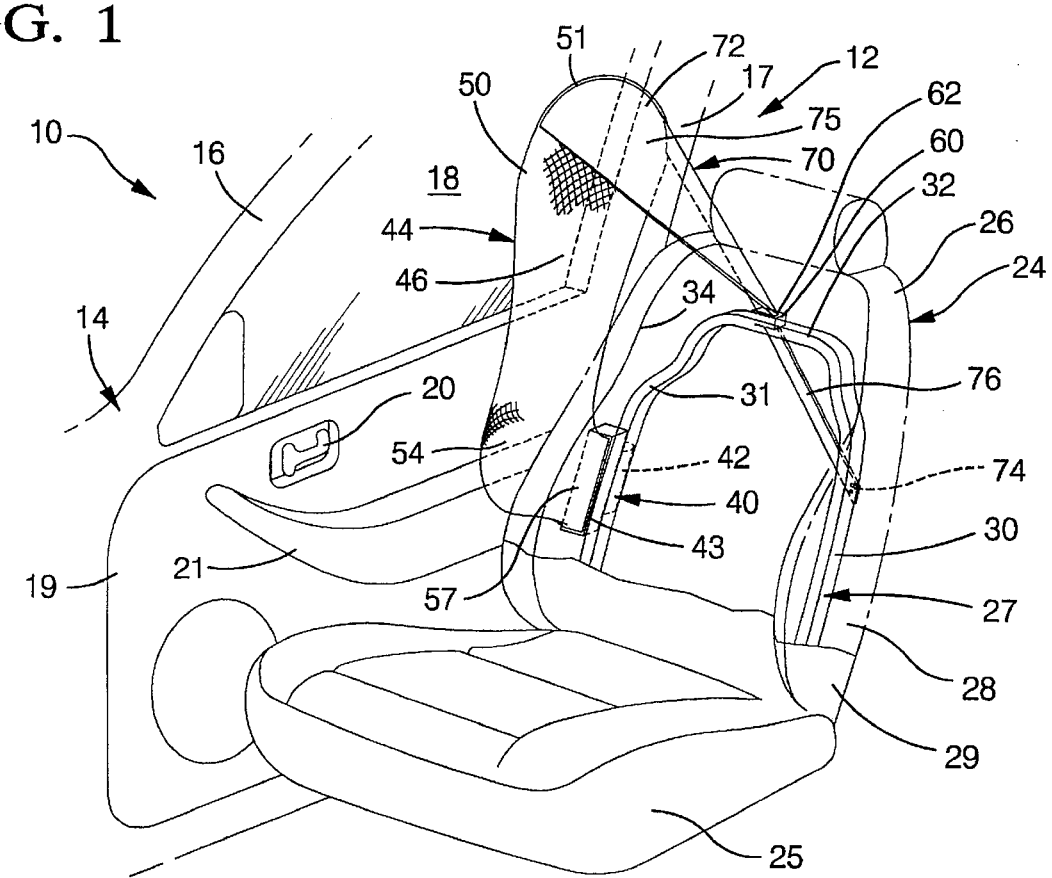
FIG. 2 is a view similar to FIG. 1, but showing the air bag assembly in the deployed condition revealing an inflated air bag and an external tether.
Figure 3:
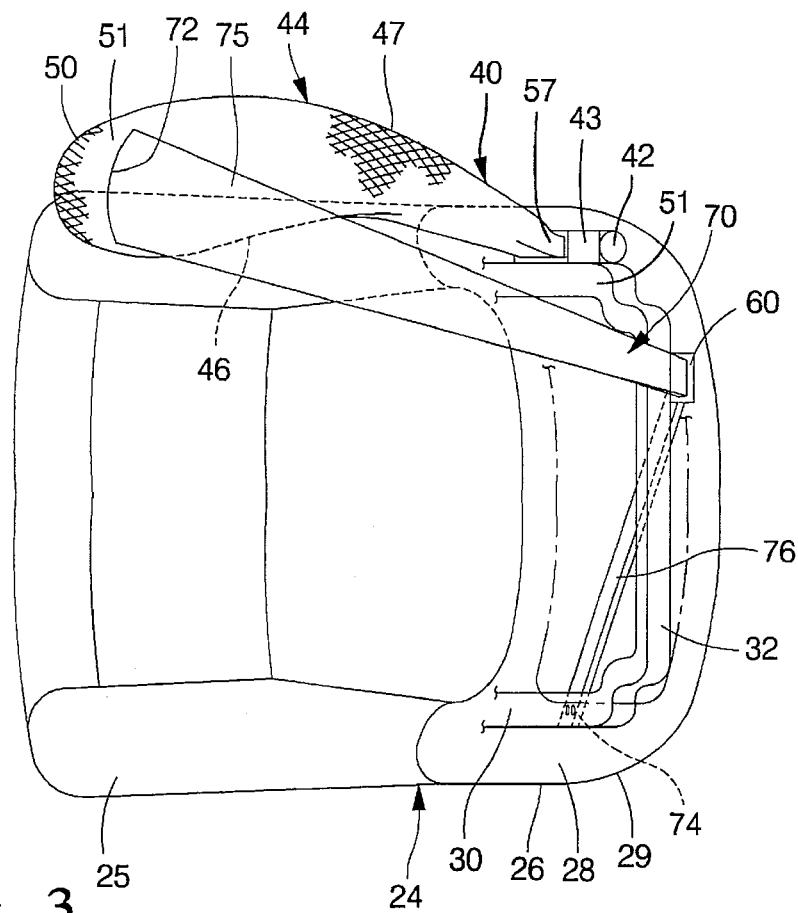
FIG. 3 is a top view of the air bag assembly in the deployed condition as shown in FIG. 2.

Referring to FIGS. 1–3, an air bag assembly 40 according to the present invention is shown preferably mounted to the seat frame 27 of the seat back 26. The air bag assembly 40 includes the basic component parts of an inflator 42, an air bag 44, and a tether 70. The folded air bag 44 is preferably stored in a housing 43 prior to air bag deployment, as shown in FIG. 1. The housing 43 is preferably secured to the seat frame 27 or other suitable vehicle structure and the inflator 42 is preferably secured to the housing 43. The inflator 42 may be of any conventional construction which contains chemicals for igniting to generate gas for discharge upon the sensing of predetermined vehicle 10 conditions. The inflator 42 preferably includes ports (not shown) through which the inflator gas is discharged to inflate the air bag 44.

As best shown in FIGS. 2 and 3, the air bag 44 is preferably made of a fabric material which is suitable for air bag 44 construction. The air bag 44 includes a laterally inboard contact face 46 located adjacent the vehicle occupant during air bag deployment, and an opposite laterally outboard face 47. The air bag 44 includes an upper portion 50 adapted for vertical alignment with the head portion of the occupant and a lower portion 54 adapted for vertical alignment with the torso portion of the occupant. The upper and lower portions 50, 54 of the air bag 44 are preferably integrally formed from the same sheet or sheets of fabric material and are in fluid communication with each other. The air bag 44 includes a mouth portion 57 in fluid communication with the inflator 42 for receiving discharging inflator gas therethrough.

The tether 70 is preferably a continuous sheet of flexible, foldable fabric material. As best shown in FIG. 1, prior to air bag deployment the tether 70 is stored partially within the housing 43 and partially within the cushion portion 28 of the seat back 26. The tether 70 includes a first end 72 attached to the air bag 44 preferably at the upper portion 50 of the air bag 44. The tether 70 further includes a second end 74 attached to the vehicle 10 and preferably spaced laterally apart and vertically below the first end 72 of the tether 70. The second end 74 of the tether 70 is preferably attached to the inboard rail 30 of the seat frame 27 of the seat 24 so that the second end 74 of the tether 70 is laterally spaced apart from the first end 72 to provide lateral support to the air bag 44 during deployment, as described further hereinafter. The tether 70 also includes a middle portion 76 extending between the first end 72 and the second end 74. The tether 70 is also located adjacent the inboard face 46 of the air bag 44 such that the tether 70 is positioned between the vehicle occupant and the inboard face 46 of the air bag 44 when the air bag 44 is deployed. The first end 72 of the tether 70 preferably has a widened portion 75 having a width approximately equal to a width of the upper portion 50 of the air bag 44. The width of the tether 70 gradually tapers to a decreased width towards the second end 74 of the tether 70. Thus, the first end 72 of the tether 70 is preferably wider than the second end 74 of the tether 70 so that the occupant interacts with the widened portion 75 of the tether 70 during air bag deployment.

The air bag assembly 40 may also include a connecting member 60 which preferably is a bracket mounted to the seat frame 27 and having a passageway 62 therethrough. The middle portion 76 of the tether 70 preferably extends through the passageway 62 of the connecting member 60 and is thus slidably connected to the vehicle 10 at the seat frame 27. As best shown in FIG. 3, the connecting member 60 restrains longitudinal movement of the tether 70 in a forward direction during air bag deployment such that the tether 70 is biased adjacent the inboard face 46 of the air bag 44 and away from the occupant.

Upon the vehicle 10 experiencing certain predetermined conditions, the inflator 42 generates inflator gas which is discharged into the mouth portion 57 of the air bag 44 to inflate the air bag 44. The force of the deploying air bag 44 breaks out through the frangible seam 34 of the seat back 26 and the air bag 44 and attached tether 70 deploy in a forwardly direction next to the door 14. Also during air bag deployment, the middle portion 76 of the tether 70 rips through the fabric material 29 of the seat back 26 as permitted by additional appropriately placed frangible seams (not shown) on the seat back 26. During air bag deployment, the tether 70 is pulled taut by the deploying air bag 44 and the first end 72 of the tether 70 provides an inboard lateral force on the upper portion 50 of the air bag 44 to provide lateral support to the inflated air bag 44. Also upon deployment, the tether 70 limits outboard lateral movement of the air bag 44 when the occupant interacts with the air bag 44. Thus, the need for an outboard support surface, such as a window or vehicle side pillar, is reduced or eliminated by the lateral support provided by the tether 70. In the particular embodiment shown, the tether 70 also provides a slight rearward force due to the biasing of the tether 70 by the connecting member 60 which helps to properly position the upper portion 50 of the air bag 44 during deployment.

It will be understood that a person skilled in the art may make modifications to the preferred embodiment shown herein within the scope and intent of the claims. Although the preferred embodiment shows the air bag 44 being housed within a housing 43 mounted to the vehicle 10 at the seat frame 27, it will further be appreciated that the housing 43 may be eliminated and the inflator 42 may be directly attached to the vehicle 10 with the air bag 44 mounted directly to the inflator 42. It will also be appreciated that the air bag 44 may be folded and stored within the cushion portion 28 of the seat back 26 or within the seat bottom 25, prior to deployment with or without the housing 43. Although the preferred embodiment shows the air bag 44 and tether 70 deploying through frangible seams 34 on the seat back 26, it will be appreciated that the air bag 44 may also deploy through a deployment door or any other openable covering on the seat back 26.

Although the preferred embodiment shows the second end 74 of the tether 70 attached to the inboard rail 30 of the seat frame 27, it will be appreciated that the second end 74 of the tether 70 may be attached anywhere on the vehicle 10. The second end 74 of the tether 70 may also be attached anywhere to the vehicle seat frame 27 including the upper rail 32 or the outboard rail 31. However, it will be appreciated that the preferred location on the seat frame 27 is on the inboard rail 30 since that attachment location provides the greatest lateral offset of the second end 74 of the tether 70 from the first end 72 of the tether 70 and thus the greatest inboard lateral force on the deploying air bag 44.

Although the preferred embodiment shows the first end 72 of the tether 70 being attached to the upper portion 50 of the air bag 44, it will be appreciated that the first end 72 of the tether 70 may be attached anywhere on the air bag 44. Although the preferred embodiment shows the first end 72 of the tether 70 connected externally to the air bag 44, it will be appreciated that the first end 72 of the tether 70 may also protrude into the air bag 44 for attachment thereto or that the first end 72 of the tether 70 may be a continuous extension of the material forming the air bag 44. Although the preferred embodiment shows the tether 70 being utilized with an air bag 44 having an upper portion 50 and a lower portion 54, it will be appreciated that the tether 70 may be used with a smaller air bag 44 which is adjacent only the head of the occupant or only the torso of the occupant.

Although the preferred embodiment shows a single tether 70, it will be appreciated that more than one tether could also be used. It will further be appreciated that more than one connecting member 60 may be provided to slidably connect the middle portion 76 of the tether 70 to the vehicle 10 or that the connecting member 60 may be eliminated. Although the preferred embodiment shows the connecting member 60 being a bracket having a passageway 62, any structure which slidably connects the middle portion 76 of the tether 70 to the seat frame 27 may be utilized, such as a loop made of metal or fabric material.

Figure 4:
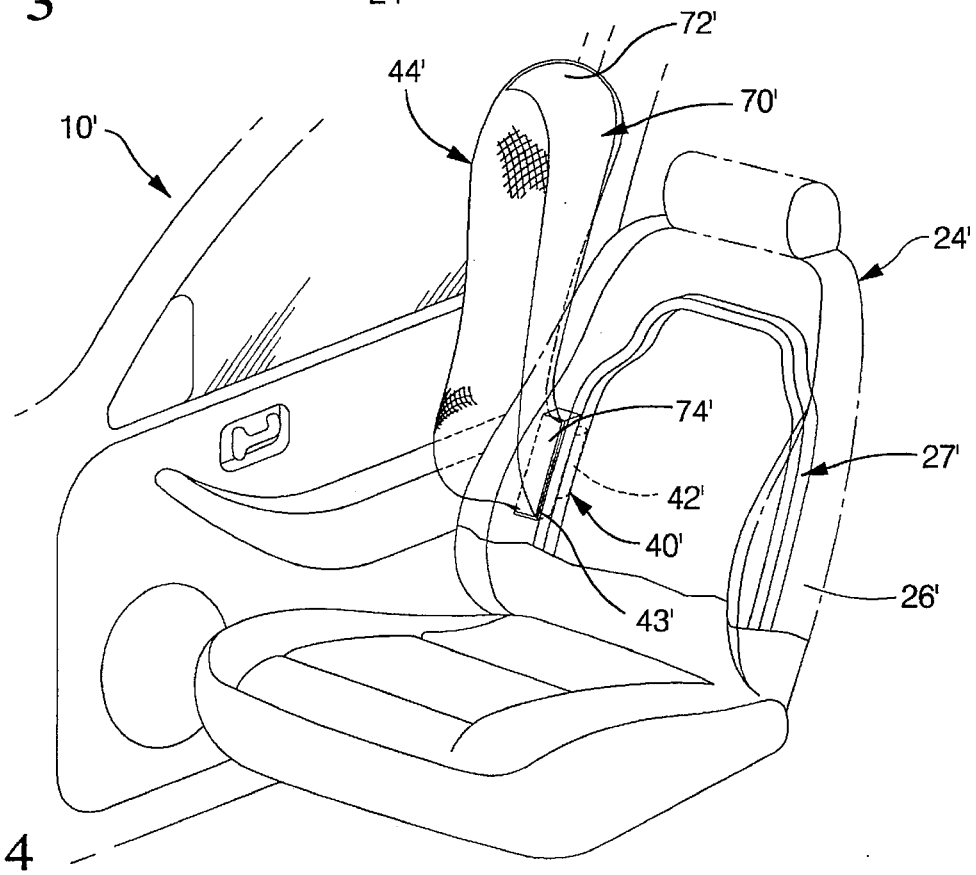
FIG. 4 is a view similar to FIG. 2, but showing an alternate embodiment of the invention.

FIG. 4 shows an alternate embodiment of the invention showing the air bag assembly 40' mounted in the vehicle seat 24' and showing the air bag 44' in the deployed condition. The embodiment of FIG. 4 has a description similar to the embodiment shown in FIGS. 1–3 and similar parts are denoted with similar numerals. However, the alternate embodiment of FIG. 4 has the second end 74' of the tether 70' attached to the vehicle 10' at the housing 43', instead of attached to the seat frame 27' of the seat 24'. In this embodiment, the second end 74' of the tether 70' advantageously does not need to be routed through the seat back 26' and the air bag assembly 40' is stored entirely within the housing 43'. However, the second end 74' of the tether 70' has a decreased lateral offset from the first end 72' of the tether 70' as compared to the embodiment in FIGS. 1–3, thus decreasing the lateral support provided by the tether 70' as compared to the embodiment of FIGS. 1–3.

FIGS. 5–7 show yet another alternate embodiment of the invention in which an air bag assembly 140 is mounted to a door 114 of a vehicle 110. As best shown in FIGS. 6 and 7, the door 114 includes inner and outer sheet metal door panels 113, 115 and an inner door trim panel 119. The inner door trim panel 119 includes a deployment opening 139 normally covered by opposing hinged cover doors 180.

The air bag assembly 140 is suitably mounted to the door 114 beneath the deployment opening 139 of the inner door trim panel 119. The air bag assembly 140 includes an inflator 142 for generating inflator gas, an air bag 144 for inflation upon generation of the inflator gas, and a housing 143 for housing the air bag 144. The air bag assembly 140 further includes a tether 170 being substantially external to the air bag 144. The tether 170 has a first end 172 attached to an upper portion 150 of the air bag 144 and a second end 174 attached to the vehicle 110 at the housing 143. The tether 170 has a middle portion 176 extending between the first end 172 and the second end 174 which is not secured to the air bag 144. The tether 170 is preferably located adjacent an inboard face 146 of the air bag 144. Thus, the tether 170 is routed from the upper portion 150 of the air bag 144, along the inboard face 146 of the air bag 144 and underneath a lower portion 154 of the air bag 144 for attachment to the vehicle 110 at the housing 143. The second end 174 of the tether 170 is laterally offset from the first end 172 of the tether 170 and extends beneath the air bag 144 for attachment to the vehicle 110. Preferably, the tether 170 has a tether width which substantially covers a width of the air bag 144 during deployment, as best shown in FIG. 5. Prior to air bag deployment, the tether 170 is also stored within the housing 143.

Upon the vehicle experiencing certain predetermined conditions, the inflator 142 generates inflator gas directly into the air bag 144. The force of the deploying air bag 144 breaks open the cover doors 180 and the air bag 144 deploys in a laterally inboard direction towards a vehicle occupant (not shown). During air bag deployment, the tether 170 is pulled taut by the inflating air bag 144 and the first end 172 of the tether 170 provides an inboard lateral force and a downward force on the upper portion 150 of the air bag 144. The force of the tether 170 provides lateral support to the air bag 144 to reduce or eliminate the need for an outboard lateral support surface. It will also be appreciated that the tether 170 pulls the upper portion 150 of the air bag 144 downwardly and laterally inboard towards an occupant seated in a seat 124 during air bag deployment.

While the alternate embodiment shown in FIGS. 5–7 shows the second end 174 of the tether 170 attached to the housing 143, it will be appreciated that the second end 174 of the tether 170 could be attached anywhere on the vehicle 110, such as to the vehicle door 114.

While the present invention has been described as carried out in a specific embodiment thereof, it is not intended to be limited thereby but is intended to cover the invention broadly within the scope and spirit of the claims.

The embodiments of the invention in which an exclusive property or privilege is claimed are defined as follows:

1. An air bag assembly in a vehicle for side impact protection of a vehicle occupant having a head portion, the air bag assembly comprising:

an inflator for generating gas;

an air bag deployable upon generation of gas by the inflator, the air bag positionable laterally outboard the occupant during deployment; and a tether being substantially external to the air bag, the tether having a first end connected to the air bag and a second end connected to the vehicle, the second end of the tether positioned for biasing the air bag laterally inboard towards the occupant during air bag inflation, whereby the tether provides lateral support to the air bag during air bag deployment.

2. The air bag assembly of claim 1 wherein the air bag includes an upper portion deployable adjacent the head portion of the occupant and wherein the tether biases the upper portion of the air bag laterally inboard towards the head portion of the occupant.

3. The air bag assembly of claim 1 wherein the vehicle includes a vehicle seat and wherein the second end of the tether is connected to the vehicle seat.

4. The air bag assembly of claim 3 wherein the seat includes a seat frame and wherein the second end of the tether is connected to the seat frame.

5. The air bag assembly of claim 1 wherein the tether includes a middle portion extending between the first end and the second end and wherein a connecting member slidably connects the middle portion of the tether to the vehicle to limit movement of the middle portion of the tether during air bag deployment.

6. The air bag assembly of claim 5 wherein the connecting member is a bracket attached to the vehicle, the bracket having a passageway through which the tether slidably extends.

7. The air bag assembly of claim 1 wherein the air bag assembly includes a housing for housing the air bag and wherein the second end of the tether is connected to the housing.

8. The air bag assembly of claim 1 wherein the first end of the tether is wider than the second end of the tether.

9. The air bag assembly of claim 1 wherein the tether includes a widened portion adjacent the first end of the tether.

10. The air bag assembly of claim 1 wherein the second end of the tether is attached to the vehicle at a location laterally spaced apart and vertically below the first end of the tether.

11. The air bag assembly of claim 1 wherein the air bag has an upper portion positionable adjacent the head portion of the occupant and wherein the first end of the tether is attached to the upper portion of the air bag and wherein the second end of the tether is attached to the vehicle at a location laterally spaced apart and vertically below the first end of the tether.

12. The air bag assembly of claim 1 wherein the air bag includes an inboard face positionable adjacent the vehicle occupant and an opposite outboard face and wherein the first end of the tether is attached to the inboard face and wherein the tether wraps around the inboard face of the air bag and wherein the second end of the tether is spaced laterally outboard from the first end of the tether and extends beneath the air bag for attachment to the vehicle whereby the tether provides lateral support to the air bag during air bag deployment.

13. The air bag assembly of claim 1 wherein the vehicle includes a vehicle door and wherein the air bag assembly is disposed on the vehicle door.

14. The air bag assembly of claim 13 wherein the air bag includes an inboard face positionable adjacent the vehicle occupant and an opposite outboard face and wherein the first end of the tether is attached to the inboard face and wherein the tether wraps around the inboard face of the air bag and wherein the second end of the tether is spaced laterally outboard from the first end of the tether and extends beneath the air bag for attachment to the vehicle whereby the tether provides lateral support to the air bag during air bag deployment.

15. The air bag assembly of claim 14 wherein the air bag assembly includes a housing and wherein the second end of the tether is attached to the housing.

16. The air bag assembly of claim 1 wherein the air bag includes a mouth portion for receiving inflator gas therein and wherein the first end of the tether is spaced apart from the mouth portion of the air bag.

17. The air bag assembly of claim 1 wherein the tether is positionable between the occupant and the air bag upon air bag deployment.

18. An air bag assembly in a vehicle for side impact protection of a vehicle occupant, the air bag assembly comprising:

an inflator for generating inflator gas;

an air bag deployable upon generation of gas by the inflator, the air bag having an inboard face and an opposite outboard face, the inboard face positionable laterally outboard the occupant during deployment; and a tether being substantially external to the air bag and being adjacent the inboard face of the air bag when the air bag is deployed, the tether having a first end connected to the air bag and a second end connected to the vehicle, the second end of the tether being spaced laterally inboard from the first end of the tether, the second end of the tether positioned for biasing the air bag laterally inboard towards the occupant during air bag inflation;

whereby upon air bag deployment, the tether provides lateral support to the air bag.

19. An air bag assembly in a vehicle comprising:

an inflator for generating inflator gas;

an air bag deployable upon generation of gas by the inflator;

a tether being substantially external to the air bag, the tether having a first end connected to the air bag, a second end connected to the vehicle, and a middle portion extending between the first end and the second end; and a connecting member slidably connecting the middle portion of the tether to the vehicle, the connecting member being a bracket attached to the vehicle, the bracket having a passageway through which the middle portion of the tether slidably extends;

whereby upon air bag deployment the tether provides lateral support to the air bag and the connecting member limits movement of the middle portion of the tether.

* * * * *